Nov. 27, 1956  E. M. KELLY  2,772,234
SLUDGE TREATMENT
Filed May 14, 1953  3 Sheets-Sheet 1

INVENTOR.
EARL M. KELLY
BY
ATTORNEY

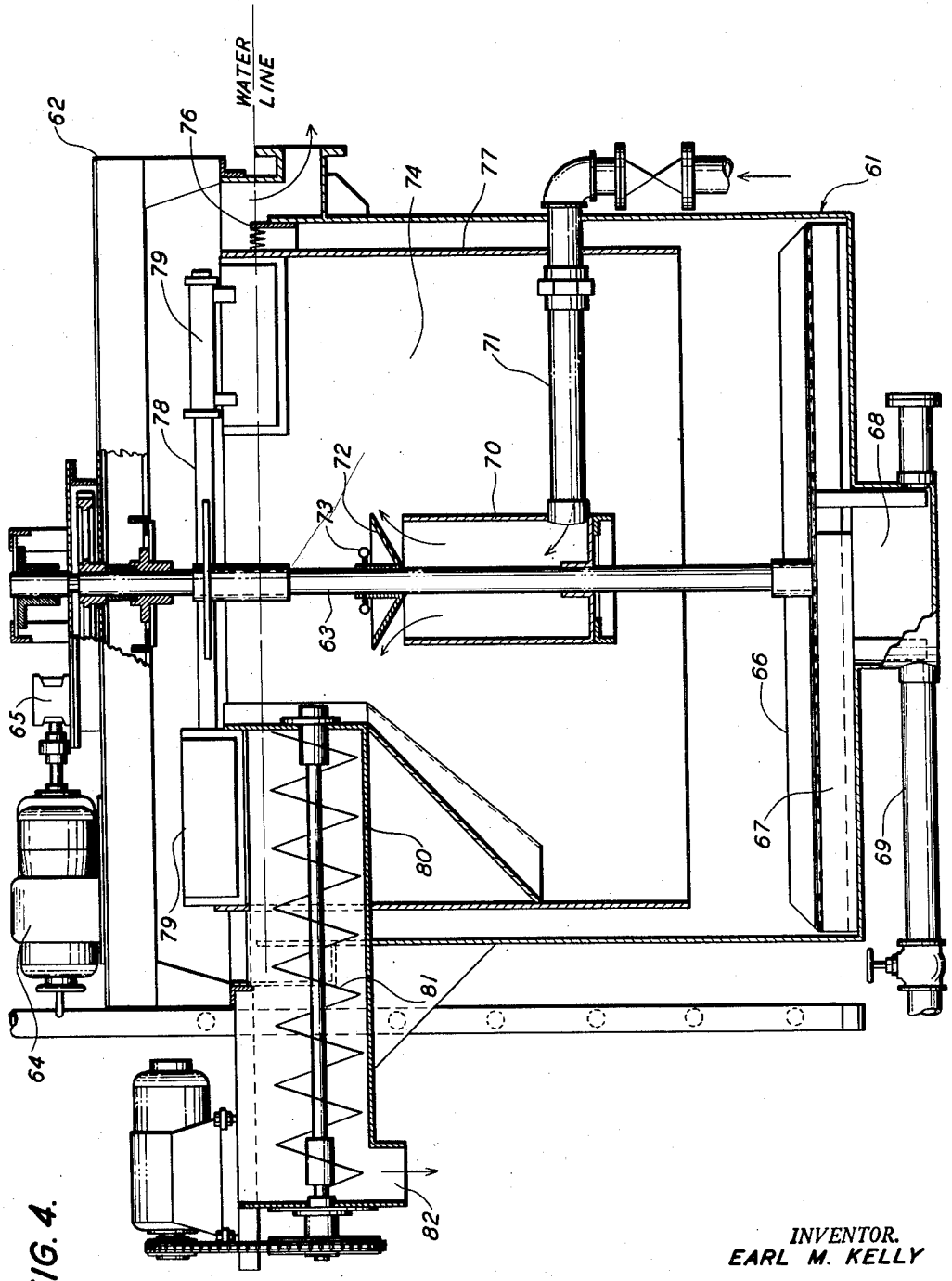

United States Patent Office 2,772,234
Patented Nov. 27, 1956

1

2,772,234

SLUDGE TREATMENT

Earl M. Kelly, Hillsborough, Burlingame, Calif., assignor to Process Engineers Incorporated, San Francisco, Calif., a corporation of California Application May 14, 1953, Serial No. 354,983

2 Claims. (Cl. 210—2)

This invention relates to sewage treatment and particularly to the treatment of sewage sludge. It provides improved methods for these purposes.

This is a continuation-in-part of my co-pending application Serial No. 27,196, filed May 15, 1948, now abandoned.

A sewage system is, is essence, merely a transportation system in which a stream of water is employed to convey municipal, industrial or agricultural wastes away from the point of origin. The resulting sewage is usually very dilute, and one of the conventional and simple methods of concentrating the solids content of a sewage is settlement. In such an operation a sludge is produced, but except in rare instances, the solids content of the sludge is still relatively low and it presents serious disposal problems.

Sewage treatment operations take various forms, depending upon the nature and proportions of the waste materials contained, the scale of the operations, and the purity requirements for the effluent. In some cases, sedimentation alone is sufficient; in others, sedimentation is accompanied by chemical precipitation; in still others, sedimentation is combined with biological treatment, employing aerobic or anaerobic organisms or both; and in still others, other combinations and permutations of the foregoing are employed. In substantially all cases, however, a sludge is produced and must be disposed of—by sludge digestion, filtration, centrifuging, incineration, drying beds or even by barging to sea. And in all of these situations the high water content of the sludge aggravates the disposal problem.

The problem is complicated further by the inherent character of sedimentation, for the greater the removal of suspended matter in a given sedimentation unit, the more dilute the underflow sludge will be. For example, in primary treatment of raw sewage by settling alone, a removal of 50 to 55% of the suspended solids can be obtained, these being removed as a sludge containing about 5% dry solids by weight. If sedimentation is supplemented by chemical precipitation or biological treatment, the removal of suspended solids will be increased to some point in the range of 55 to 90%, but increased solids removal is almost invariably accompanied by a decrease in sludge density to some place in the range of 4 to 1% dry solids. Thus, whether the sedimentation be supplemented by sludge digestion, chemical treatment, standard or high rate trickling filters, the activated sludge process, or combinations of these supplementary treatments, increased solids removal involves a decrease in sludge density, with consequent marked increase in the volume of the sludge to be disposed of. It should be borne in mind that a decrease in the solids content of sludge from 4% to 2% means that the volume of sludge to be handled is substantially doubled.

If the sludge is subjected to anaerobic digestion, sludge dilution presents a further problem, for a decrease in

2 the solids content of the sludge sent to the digester results in an increase in the quantity of digester liquor produced. This liquor is odorous, has a high biological demand and is high in suspended solids. For lack of anything else to do with it, common practice is to keep it in the treatment circuit by returning it to some stage of the treatment. The operation of many plants is sometimes upset due to fouling by the return of digester liquor.

Sewage sludge is difficult to filter, and the resulting filter cake has a high water content, so that it is both voluminous and "sloppy," and hence difficult to handle on conveyors and the like.

In the course of my investigations, I have found that all of the foregoing difficulties can be reduced substantially, with marked improvement in the entire operation of a sewage treatment plant, by subjecting sewage sludge to a particular type of flotation. Thus I have discovered that the solids content and the filtering qualities of sewage sludge can be increased markedly by pressurizing it, dissolving in the pressurized sludge more gas than it can contain at atmospheric pressure, and introducing the resulting pressurized charged mixture into a pool maintained at a pressure sufficiently low that at least some of the charging gas comes out of solution and forms bubbles in the pool. These bubbles attach themselves to sludge particles and buoy them to the surface of the pool, where they form a relatively thick scum that is skimmed or otherwise removed from the pool. This scum has a higher solids content than the original sludge and, moreover, has improved filtering characteristics, so that less filter area is required to handle it while at the same time a thicker and firmer cake of relatively low moisture content is formed.

Sludge settled under quiescent conditions soon attains substantially maximum density. Thereafter, very little increase in density is achieved, even if the settlement period be prolonged for days. It is in this sense that the term "maximum density" is employed herein.

The solids content of the scum produced from the sludge can be increased further if the settlement operation in which the sludge is produced is controlled to produce a sludge of less than maximum density for that settlement operation. By way of example, if in a given clarifier operating on raw sewage it is possible to produce a sludge containing 5% dry solids, this sludge can be given a somewhat higher solids content (say 6%) by subjecting it to the flotation operation described in the preceding paragraph, but if this same clarifier is operated to produce a sludge containing only 1 to 2% solids and this sludge is then subjected to the flotation operation, the solids content of the resulting scum will be much higher (say 8%). Now the capacity of the clarifier is increased as the density of its underflow sludge is diminished, so that this, combined with the flotation operation, gives a two-fold benefit.

Both the density and the filtering characteristics of the scum produced from the sewage sludge are increased if the sludge, in addition to being charged with gas, is diluted substantially with water prior to its introduction to the pool in which the flotation takes place. I prefer to dilute the sludge with at least one volume of water, and good results have been obtained when the dilution was as high as 15 to 1, the optimum range being about 5 to 1 to 8 to 1. The dilution and the charging may take place substantially simultaneously. Thus in my preferred operation I first charge a pressurized stream of fresh water or clarified effluent with gas and then mix this charged stream with a pressurized stream of sludge. The amount of gas introduced in this preferred operation is in excess of that which will dissolve in the resulting mixture at the pressure prevailing on the flotation pool, to assure that the gas will come out of solution in the pool and buoy up the solids, but not in excess of that which will dissolve in the mixture at the pressure prevailing on it prior to its discharge into the pool, so that there will be little or no free or undissolved gas discharged into the pool. Such free gas forms large bubbles that tend to destroy the scum instead of forming it. If excess gas is employed, it should be given an opportunity to escape from the pressurized mixture before this is discharged into the pool where flotation occurs.

The proportion of gas to be introduced in any instance will depend upon its solubility, and upon the temperature of the mixture as well as on the pressures prevailing in the charging and flotation steps, but a general idea of the proportions desired can be obtained from the following detailed examples.

The proportion of diluent water to employ will vary depending upon the nature of the sludge and particularly upon its content of dissolved organic and inorganic compounds, particularly the latter. Here again the following detailed examples will serve as a general guide.

Although various gases, such as $CO_2$ or the combustion products from the gas produced in anaerobic sludge digestion, may be employed to charge the sludge and bring about some concentration of its solids content through the flotation operation of my invention, a gas such as air, having a high oxygen content is preferred, and generally speaking the higher the oxygen content the better the result. The oxygen not only has a beneficial effect in floating the solids out of the sludge, but also helps to saisfy the biological oxygen demand of the dissolved organic compounds etc. in the sludge.

After the gas, with or without the diluting water, has been introduced into the pressurized sludge, it is beneficial to hold the mixture under pressure for a short period of time (say 30 seconds to 1 minute) in order to assure that all of the gas is in solution in the mixture.

The pool in which the flotation occurs should be relatively quiescent to prevent the scum from being broken, with resultant sinking of the solids previously buoyed up. Skimming, in consequence, should be quiet and smooth. The scum should be removed continuously as it is formed. Otherwise the gas tends to dissipate with resultant settling of solids that have been buoyed up at least once already.

The area of the pool surface made available to scum formation depends to some extent upon pool depth and the solids content of the pool. Generally speaking, good results have been obtained with one square foot of pool surface for an inflow of 1½ to 10½ gallons of mixture per minute, employing a pool about six feet in depth and with the solids content of the inflowing mixture ranging up to 6% by weight. Optimum results usually have been obtained with flow rates of 2 to 3 gallons of influent per square foot of pool area for scum accumulation.

Optimum detention time in the pool is affected by solids content, amount of gas coming out of solution, pool depth, temperature and perhaps other factors, but good results have been obtained with average detention times ranging from as low as 4.3 to as high as 30 minutes.

The foregoing and other aspects of my invention will be understood more thoroughly in the light of the following description of presently preferred practices, these being illustrated by the accompanying drawings in which:

Fig. 4 is an elevation, partly in section, of the flotation device of Fig. 3.

Figure 1:
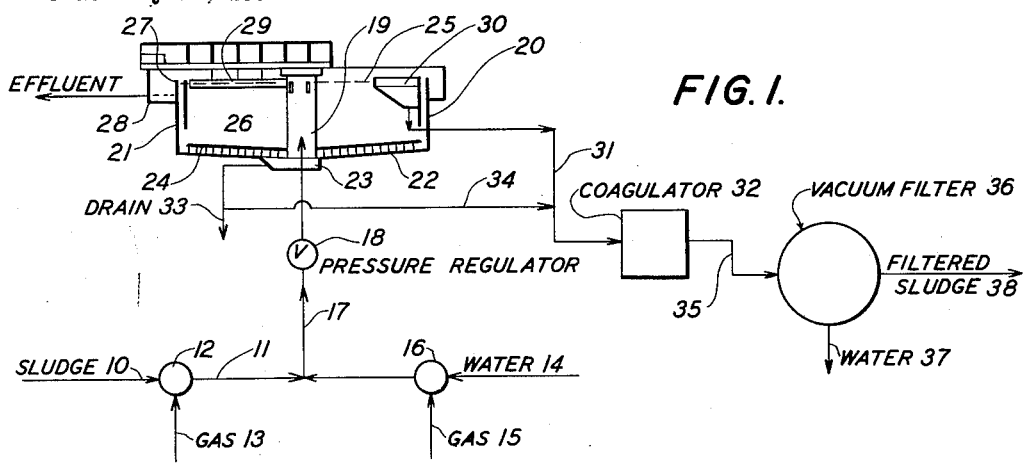
Fig. 1 is a flow sheet of a portion of a sewage treatment plant illustrating the application of the invention to the treatment of digester sludge.

In the apparatus of Fig. 1, digester sludge from a conventional anaerobic sludge digester is treated to increase its solids content, make it more amenable to coagulation, and improve its filtration characteristics. Digester sludge 10 flows continuously through a line 11 containing a conventional injector 12 through which gas 13 is introduced. A pressurized stream of water 14 is similarly charged with gas 15 in a like injector 16. The resulting charged sludge and charged water streams then merge and flow through a line 17 having a pressure regulating valve 18. The charged mixture then flows continuously into the lower portion of a central well 19 of a flotation device 20, say that described and claimed in co-pending application Serial No. 115,853, filed September 15, 1949, now Patent No. 2,679,477. This device is a cylindrical tank having an upright outside wall 21 and an inverted frusto-conical bottom 22 that slopes gradually to a conventional sludge pit 23 at the bottom. Conventional raking means 24 move settled material in a diminishing spiral path along the tank bottom to the sludge pit.

The tank contains an aqueous pool up to a liquid level 25 from which clarified effluent, after passing under an annular baffle 26, overflows a peripheral lip 27 into a peripheral effluent launder 28. The device also has a rotary skimming blade 29 at the pool level. This skimming blade, like the rakes in the bottom of the tank, rotates slowly around a vertical axis and moves scum collected at the surface of the pool into a scum box 30 from which it flows through line 31 to a coagulating tank 32. Solids, if any, collected in the bottom of the flotation device are drained to waste through a line 33 or sent to join the scum through a line 34 which joins the line 31 ahead of the coagulator.

The coagulator is simply an agitation device in which a coagulating chemical, such as ferric chloride, is added to and mixed with the scum, and from the coagulator the resulting mixture flows through a line 35 to a conventional vacuum filter 36 of the drum type. Water 37 is removed from the process in the filter, the other product being sludge or scum reduced to a filter cake 38.

The operation of the process of Fig. 1 as well as its advantages are indicated in the following tables. Table 1 gives the characteristics of the digested sludge which was tested. In one case this digested sludge was sent directly to vacuum filtration, the results of this operation being given in Table 2. In another case identical digester sludge was subjected to elutriation (i. e. dilution with water and agitation) followed by vacuum filtration, the results of this test being given in Table 3. In the third case the digester sludge was treated in the apparatus of Fig. 1 and was diluted, charged with gas, subjected to pressure flotation, followed by coagulation and vacuum filtration. The results of this operation are given in Table 4.

TABLE 1

*Characteristics of digested sludge tested*

| | |
|---|---|
| Type of raw sludge | Primary. |
| Moisture content digested sludge | 90.8%. |
| Solids content digested sludge | 9.2%. |
| Volatile content: | |
|     Raw | 75%. |
|     Digested | 55%. |
| Alkalinity digested sludge | 3295 p. p. m. |
| Temperature digested sludge | 90° F. |

TABLE 2

*Vacuum filtration of digested sludge*

(a) Moisture content:
    1. Digested_____ 90.8%.

2. Filtered_____ 74.6%.
(b) Conditioning chemicals:
 1. Type_____ Ferric chloride.
 2. Amount—dry wt. basis_____ 6.4%.
(c) Filtration rate_____ 4.5 lb./sq. ft./hr.

TABLE 3

*Elutriation and vacuum filtration of digested sludge*

(a) Type of elutriation_____ Single stage.
(b) Dilution water ratio_____ 3 to 1.
(c) Moisture content:
 1. Digested sludge_____ 90.8%.
 2. Elutriated_____ 93.1%.
 3. Filtered_____ 72.3%.
(d) Conditioning chemicals:
 1. Type_____ Ferric chloride.
 2. Amount_____ 3.2%.
(e) Filtration rate_____ 5.8 lb./sq. ft./hr.
(f) Elutriation thickener:
 1. Overflow rate_____ 0.4 G. P. M./sq. ft.
 2. Detention period_____ 3.0 hr.
(g) Characteristics thickener overflow:
 1. Suspended solids_____ 850 p. p. m.
 2. 5-day BOD_____ 390 p. p. m.

TABLE 4

*Pressure flotation diluted digested sludge, sludge heating and vacuum filtration*

(a) Type of gasification:
 1. Sludge_____ Stack gas.
 2. Dilution water_____ Stack gas.
(b) Pressure of gasification_____ 15 p. s. i.
(c) Dilution water ratio_____ 3 to 1.
(d) Flotation:
 1. Overflow rate_____ 3.5 G. P. M./sq. ft.
 2. Detention period_____ 12.8 min.
(e) Temperatures:
 1. Digested sludge_____ 90° F.
 2. Dilution water_____ 70° F.
 3. Conditioned sludge_____ 150° F.
(f) Moisture content:
 1. Digested sludge_____ 90.8%.
 2. Floated sludge_____ 86.0%.
 3. Filtered sludge_____ 69.6%.
(g) Conditioning chemicals:
 1. Type_____ Ferric chloride.
 2. Amount_____ 2.1%.
(h) Filtration rate_____ 10.6 lb./sq. ft./hr.
(i) Characteristics of flotation liquor:
 1. Suspended solids_____ 320 p. p. m.
 2. 5-day BOD_____ 145 p. p. m.

Comparison of the data in the foregoing tables shows the following:

1. The flotation process of the invention produces a thicker sludge to be applied to the filter. Thus sludge density to the filter is increased from 9.2% solids to 14% solids in the flotation process. As shown by Table 3, elutriation does not accomplish the same result, there being an actual decrease in solids content of the sludge sent to the filter from 9.2% to 6.9%.

2. The process of the invention results in a drier filter cake. Thus the solids content of the filter cake in the operation of Table 4 is 30.4%, as compared with a solids content of 27.7% in the filter cake obtained by elutriation followed by a vacuum filtration, and a solids content in the filter cake of only 25.4% when the digester sludge is filtered without elutriation or flotation.

3. The process of the invention requires less coagulating chemical to prepare the sludge for filtration, only one-third as much as for straight filtration, and about two-thirds as much as when elutriation is employed ahead of filtration.

4. The filter rate is greatly increased by the process of the invention. Thus the floated sludge filters 2.3 times as fast as the straight sludge, and 1.83 times as fast as the elutriated sludge.

5. The process of the invention requires much less tank volume, only 7% of that required for elutriation.

6. The clarified liquor produced in the process of the invention is much better in that both its BOD and its suspended solids are much lower.

The flotation exemplified by Table 4 was accomplished at atmospheric pressure, and the mixture released to flotation was substantially saturated with stack gas at 15 pounds per square inch above atmosphere. As Table 4 shows, the average detention time of the material in the flotation apparatus was 12.8 minutes and the detention time in the system after charging and prior to release through the pressure regulator was approximately one minute. If, instead of stack gas, air is used in the operation of Fig. 1, even better results are obtained.

Figure 2:
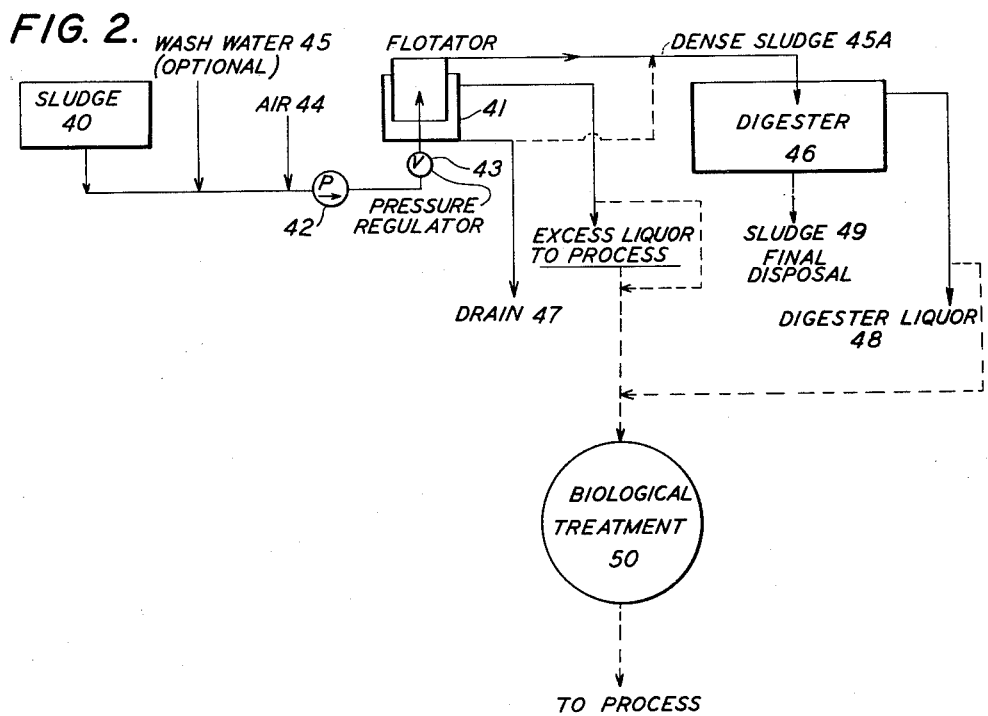
Fig. 2 is a flow sheet of a portion of a sewage treatment plant illustrating the application of the invention to sludge from a primary clarifier.

Fig. 2 illustrates the application of the invention to primary sludge produced from raw municipal sewage in a conventional clarifier, not shown. This primary sludge from a sump 40 is pumped to a pressure flotation device 41 by a centrifugal pump 42 through a pressure regulator valve 43. Compressed air 44 is added to the sludge on the suction side of the pump and it is also desirable to add several volumes, say five, of wash water 45, which may be clarified effluent. The sludge alone, or the mixture of sludge and wash water, is completely saturated with air at super-atmospheric pressure, say 30 pounds per square inch, and released continuously into a pool of liquid in the flotation device. The latter may be of the type of Fig. 1 or that of Fig. 4. Air comes out of solution in the pool in the flotation device. The air forms fine bubbles which attach themselves to solid particles of sludge, buoying the bulk of them upward to form a scum or dense sludge 45A at the pool surface. This is skimmed off and sent to a conventional sludge digester 46. Some of the coarser sludge particles may settle out, and in such case are removed from the drain 47 at the bottom of the flotation device to be sent to waste or optionally mixed with the denser sludge or scum from the top of the flotation device.

The operation in the sludge digester is a conventional one, except that the sludge to the digester contains substantially less liquid, so that the amount of digester liquor 48 produced is small. The sludge 49 from the digester goes to final disposal and the digester liquor may be bled from the system, but ordinarily will be returned to the circuit ahead of conventional biological treatment 50, say a trickling filter, in which aerobic organisms operate in the conventional fashion.

The clarified effluent from the flotation device may be removed from the process or sent to biological treatment along with the digester liquor and other clarified effluents from the system.

The following is a practical example of an operation conducted with the apparatus of Fig. 2. The primary sludge from the sump contained about 3% solids. It was produced from typical municipal sewage and could have been withdrawn in a thicker state, say 5% solids, but was deliberately withdrawn in a thin condition in order to increase the capacity and efficiency of the clarifier and also aid subsequent flotation. To the sludge was added approximately three volumes of wash water for elutriation purposes, and the resulting mixture was nearly saturated with air at a pressure of 30 to 45 pounds per square inch (gauge), the latter being supplied on the suction side of the pump. The charged mixture of sludge, water and air was well mixed in passing through the centrifugal pump and held for about one minute at 30 to 45 pounds per square inch (gauge) between the pump and the pressure regulator before being discharged into the flotation device. The average residence time in the flotation tank was about 10 minutes.

More than 80% of the total solids in the sludge was floated out in the flotation apparatus as a scum containing about 8% solids. The balance of the solids was withdrawn intermittently from the bottom of the flotator as a sludge containing about 5% solids.

Had the flotation step not been employed, the feed to the digester would have contained only about half as much solids, and hence its volume would have been almost double with a like increase in volume of digester liquor to dispose of.

Figure 3:
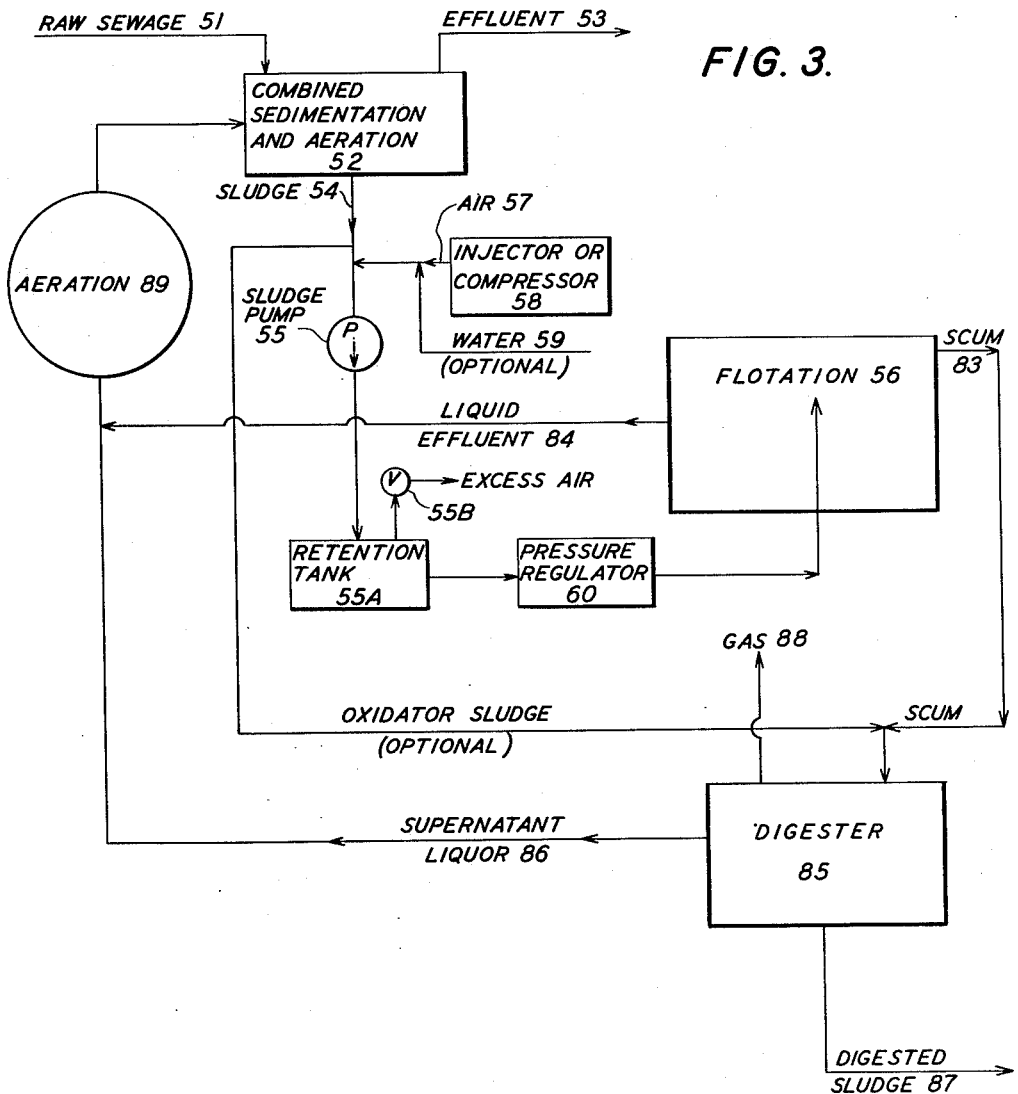
Fig. 3 is a flow sheet of a sewage treatment plant adapted to handle a mixture of municipal and brewery sewage.

Another sewage treatment operation employing my invention is illustrated in Figs. 3 and 4. In this instance the raw sewage is that of a small community of approximately 10,000 people, combined with the waste from a large brewery operation. The raw sewage 51 sent to the plant has a BOD of about 300 p. p. m., and contains about 300–400 p. p. m. solids. This raw sewage, after conventional grit removal (not shown) is sent to a combined aeration and sedimentation device 52 of the type disclosed and claimed in U. S. Patent No. 2,506,927. A clarified effluent 53 is obtained in this device, and a sludge 54 containing about 1 to 2% solids. This sludge goes continuously to a centrifugal pump 55 and thence through a retention tank 55A from which undissolved air escapes through a pressure relief valve 55B. The sludge next passes through a pressure regulator 60 to a flotation apparatus 56 which is shown in detail in Fig. 4. On the suction side of the pump, air 57 is introduced continuously into the sludge by means of a compressor or an injector 58. A stream of water 59 may be added with the air so that the sludge is both elutriated and charged but this is not essential because the sludge is already dilute when withdrawn from settlement. Good results have been obtained by dissolving about 6% by volume of air at a pressure of 30 pounds per square inch gauge at high side of the pressure reduction valve. In passing through the centrifugal pump the mixture of air, sludge and water is thoroughly churned so that the air is completely dissolved in the sludge at an elevated pressure, say 30 pounds per square inch gauge. The mixture is maintained under the pressure until it passes through the pressure regulator into the flotation device.

The operation of the flotation device can best be understood through reference to Fig. 4, which shows that it comprises an upright cylindrical flat-bottomed tank 61 with a super-structure 62 which rests on the top of the tank and supports a vertical centrally disposed shaft 63 which is turned slowly by a variable speed drive unit 64 coupled to the shaft through a speed reducer 65. The lower end of the shaft carries a horizontal arm 66 with a squeegee blade 67 which drags on the tank bottom and moves any sludge settling on the bottom into a sludge pit 68 from which it may be withdrawn through a valved line 69. The diluted charged sludge to be subjected to flotation is introduced into a feed well 70 which is an open-topped cylindrical centrally disposed container in the approximate middle of the tank. The flow into the feed well is through a pipe 71 passing through the side of the tank and into the side of the feed well near its bottom. An inverted frusto-conical deflector 72 is fastened to the drive shaft by thumb screws 73 or the like, and its height on the drive shaft may be adjusted to control the flow of the feed upward out of the feed well into a pool of liquid 74 maintained in the tank up to a liquid level established by a peripheral overflow weir 76 around the top of the tank. An annular baffle 77 is disposed in the tank projecting above the liquid level and downwardly in the tank about two-thirds of the way to the bottom.

A scraper arm 78 is attached to the central shaft near the liquid level and carries two flexible float scrapers 79 which rotate slowly in the tank and carry scum which accumulates at the liquid level around the tank into a scum box 80. Scum dropping into the box is conveyed outwardly by a screw feeder 81 to a discharge chute 82.

In the operation of Figs. 3 and 4 the feed rate into the flotation device ranges from 2 to 5 gallons per minute per square foot of pool surface. The scum 83 scraped off the top of the pool and sent to the digester contains about 6% solids. Liquid effluent 84 rises in the annular space between the baffle and the outside tank wall to the overflow weir. A small amount of heavy solids, say 5 to 20% of those in the feed, accumulates in the bottom of the flotation device and is scraped out and removed continuously through the sludge pit.

The scum from the flotation device, as shown in Fig. 3, goes to a standard anaerobic sludge digester 85 which produces supernatant liquor 86, digested sludge 87, and gas 88. This digested sludge may be subjected to filtration, centrifuging, removed in barges, sent to drying beds, or subjected to pressure flotation in accordance with the invention prior to filtration in order to increase its solids content (as in Fig. 1). The supernatant liquor from the digester is sent back to the combined aeration-sedimentation unit 52. The effluent from the flotation device is likewise returned to sedimentation. If desired, either or both of these returned flows may be subjected to aeration 89 in any conventional equipment prior to being returned to the sedimentation step.

At times when the flotation device is shut down for cleaning or repairs, the sludge settled in the sedimentation device may be sent directly to the digester as shown.

The operation of the apparatus illustrated in Fig. 3 has resulted in greatly reducing the quantity of digester liquor to be handled and has minimized the danger of fouling the process through digester liquor return.

I claim:

1. In the treatment of sewage containing solids suspended in liquid involving introducing the sewage into a pool in which the solids would settle to the bottom to produce a sludge of maximum density under quiescent conditions, and the withdrawal of sludge from the bottom of the pool, the improvement which comprises introducing the sewage into the pool and withdrawing the sludge from the bottom of the pool at such fast rates that the withdrawn sludge contains less than 5% solids by weight and is substantially less than maximum in density, dissolving gas in the withdrawn sludge under pressure and thus charge it, introducing the charged pressurized sludge into a second pool maintained at a reduced pressure so that at least some of the gas comes out of solution in the second pool as bubbles and raises solids in the second pool to form a scum on its surface, and skimming the scum from the surface.

2. In the treatment of sewage containing solids suspended in water involving introducing the sewage into a pool in which the solids would settle to the bottom to produce a sludge of maximum density under quiescent conditions and the withdrawal of sludge from the bottom of the pool, the improvement which comprises introducing the sewage into the pool and withdrawing the sludge from the bottom of the pool at such fast rates that the withdrawn sludge contains less than 5% solids by weight and is substantially less than maximum in density, diluting the withdrawn sludge with water, dissolving gas in the withdrawn sludge under pressure and thus charge it, introducing the charged diluted pressurized sludge into a second pool maintained at a reduced pressure so that at least some of the gas comes out of solution in the second pool as bubbles and raises solids in the second pool to form a scum on its surface, and skimming the scum from the surface.

References Cited in the file of this patent

UNITED STATES PATENTS

| | | |
|---|---|---|
| 743,959 | Turner | Nov. 10, 1903 |
| 864,856 | Norris | Sept. 3, 1907 |
| 1,056,548 | Imhoff | Mar. 18, 1913 |
| 2,679,477 | Kivari et al. | May 25, 1954 |